Figure 1:
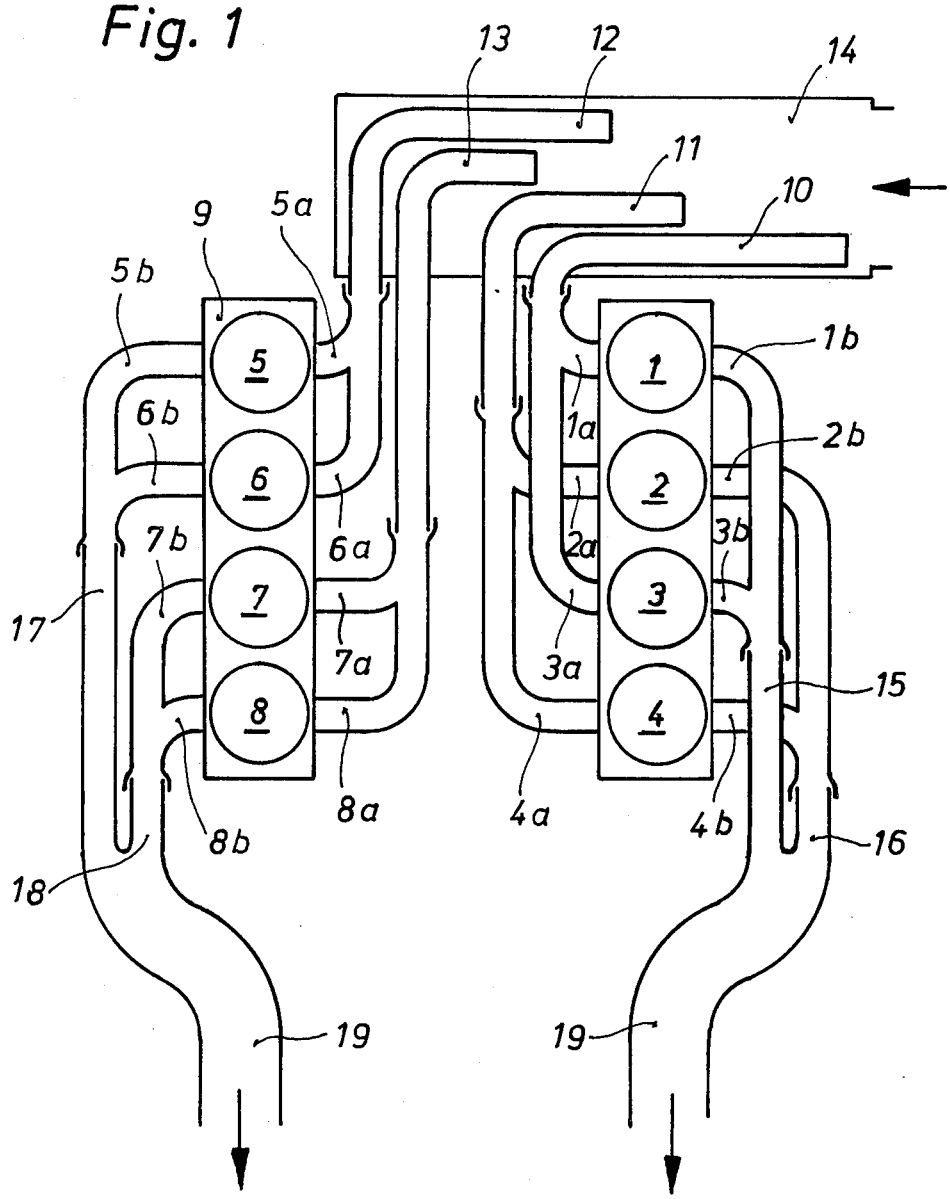

United States Patent [19]

Löhr et al.

[11] 4,116,172
[45] Sep. 26, 1978

[54] NATURALLY ASPIRATED EIGHT CYLINDER INTERNAL COMBUSTION ENGINE

[75] Inventors: Joachim Löhr, Schwaig; Friedrich Bauer, Mittelhembach; Kurt Leonhard, Nüremberg, all of Fed. Rep. of Germany

[73] Assignee: Maschinenfabrik Augsburg-Nürnberg Aktiengesellschaft, Nüremberg, Fed. Rep. of Germany

[21] Appl. No.: 694,160

[22] Filed: Jun. 9, 1976

[30] Foreign Application Priority Data

Jun. 10, 1975 [DE] Fed. Rep. of Germany ....... 2525769

[51] Int. Cl.² ............................................. F02B 75/18
[52] U.S. Cl. ............................... 123/52 M; 123/65 E; 60/313
[58] Field of Search ............... 60/312, 313; 123/52 R, 123/52 M, 52 MB, 52 MV, 65 E

[56] References Cited

U.S. PATENT DOCUMENTS

| | | | |
|---|---|---|---|
| 1,985,944 | 1/1935 | Meyer | 123/52 M |
| 1,985,996 | 1/1935 | Kalb | 123/52 M |
| 2,004,002 | 6/1935 | Kalb | 123/52 M |
| 2,034,397 | 3/1936 | Kalb | 123/52 M |
| 2,199,276 | 4/1940 | Barkeij | 123/52 M |
| 2,649,083 | 8/1953 | Vogel | 60/312 |
| 2,862,490 | 12/1958 | Trisler | 123/122 H |
| 2,940,249 | 6/1960 | Gospodar | 60/312 |
| 2,957,304 | 10/1960 | Berchtold | 123/65 E |
| 3,146,764 | 9/1964 | Elsbett | 123/52 M |
| 3,298,332 | 1/1967 | Ellsbett et al. | 123/52 |

FOREIGN PATENT DOCUMENTS

| | | | |
|---|---|---|---|
| 440,955 | 1/1936 | United Kingdom | 60/313 |
| 442,940 | 2/1936 | United Kingdom | 123/65 E |

Primary Examiner—Charles J. Myhre
Assistant Examiner—Craig R. Feinberg
Attorney, Agent, or Firm—Walter Becker

[57] ABSTRACT

A naturally aspirated eight cylinder internal combustion V-engine in which the cylinders of each bank of cylinders are divided into groups of two cylinders each, and in which the inlet ports of each group pertaining to one and the same cylinder bank are brought together to a joint inlet manifold. Each two cylinders of one and the same group of cylinders have a firing interval which equals or is greater than the opening period of the respective inlet valve pertaining to the respective group of cylinders.

4 Claims, 7 Drawing Figures

NATURALLY ASPIRATED EIGHT CYLINDER INTERNAL COMBUSTION ENGINE

The present invention relates to a naturally aspirated eight cylinder internal combustion V-engine in which the firing in the individual cylinders of a cylinder bank occurs at different time intervals and in which groups of several inlet ports are combined into a common inlet manifold and advantageously groups of several exhaust ports are combined into a common exhaust manifold.

In high speed naturally aspirated internal combustion engines designers today frequently utilize the dynamic characteristics of the inlet system to improve cylinder filling and, consequently, engine output. This type of dynamic supercharging, for instance, reflection supercharging, has to be distinguished from resonance supercharging which is also applied in some cases. In the case of reflection supercharging, which is proposed to be adopted in connection with the present invention, the negative pressure wave generated when opening an inlet valve travels, as is well known, at the speed of sound to the end of the open suction pipe and, from there, back into the cylinder as a pressure wave with a phase displacement of 180°. If inlet ports are suitably grouped, and the common inlet manifolds are coordinated with respect to their diameters and their length to match the desired speed, this pressure wave will, while the inlet valve is still open, result in supercharging or post-charging over and above the filling otherwise attainable with manifolds. This kind of supercharging effect can be extended to a relatively wide speed band, when the cylinder filling will preferably take place before the inlet valve closes or directly after the inlet valve opens.

This type of supercharging has hitherto been preferably adopted for four cylinder, six cylinder and twelve cylinder engines. In the case of eight V-engines, however, where for reasons of mass balance and bearing load, a firing order of 1-5-7-2-6-3-4-8 and a firing interval of 90° crank angle is usually adopted, difficulties have been encountered because the firing intervals within the individual cylinder bank tend to be rather non-uniform. If the inlet ports of a cylinder bank were to be combined into a common inlet manifold, there would be multiple overlapping of the individual cylinders with respect to their suction timing and, consequently, there would be considerable mutual interference. For purposes of elaborating this point, there may now, by way of example, be considered an engine having the above mentioned firing order. The cylinders 1 to 4 form the one cylinder bank, whereas cylinders 5 to 8 form the second cylinder bank. If cylinder 1 fires, cylinder 2 will follow after 270° crank angle, cylinder 3 after 180° crank angle, cylinder 4 after 90° crank angle and cylinder 1 after another 180° crank angle. Assuming that the opening time of the inlet valves is approximately 240° crank angle, the opening times of the inlet valves on cylinders 2 and 3, 3 and 4 as well as 4 and 1 will overlap, thus preventing a good volumetric efficiency being achieved.

The aforementioned difficulties could be overcome if a separate induction pipe were provided for each cylinder which, however, especially in the case of automotive engines, is impracticable because of the great amount of space required. The above remarks also correspondingly apply to the exhaust ports where overlapping of exhaust periods is liable to cause an increase in residual gas pressure and, consequently, the pumping work.

It is, therefore, an objective of the present invention to avoid the disadvantages referred to in an internal combustion engine of the type described above and to achieve an improvement in volumetric efficiency and output and, consequently, also an improvement of the other performance data without any excessive space requirements.

These and other objects and advantages of the invention will appear more clearly from the following specification in connection with the accompanying drawings, in which:

FIG. 1 is a diagrammatic representation of an eight cylinder V-engine with inlet and exhaust ports and with the associated manifolds according to the invention.

Figure 2:
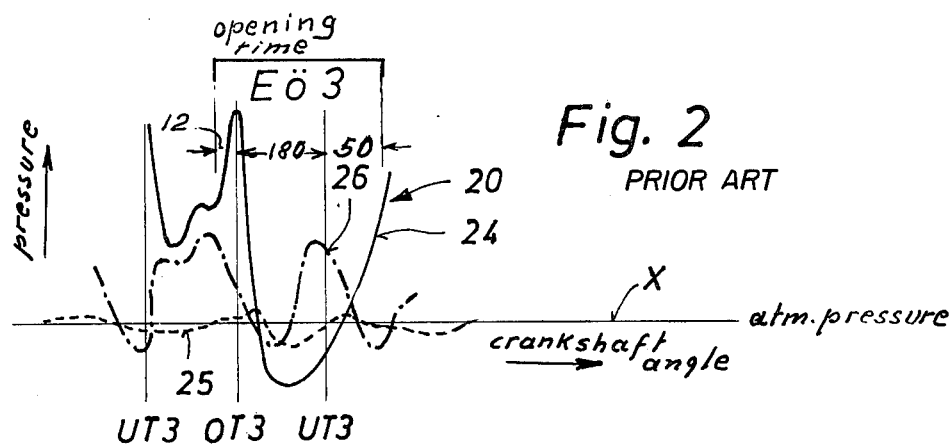
Figure 2A:
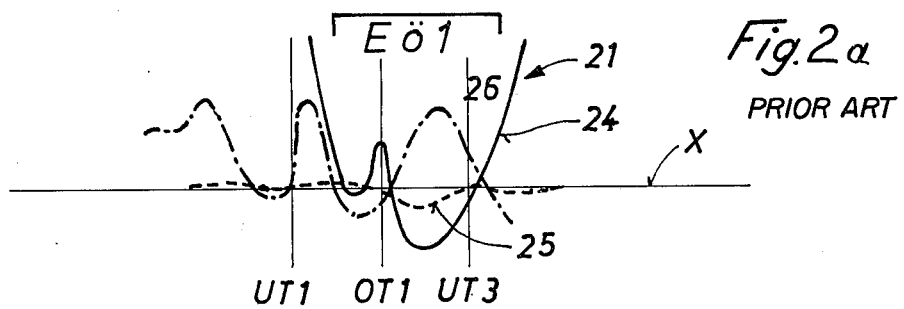

FIGS. 2 and 2a respectively show by way of graphs the pressure characteristics in the cylinders 3 and 1 without the arrangement according to the invention.

Figure 2B:
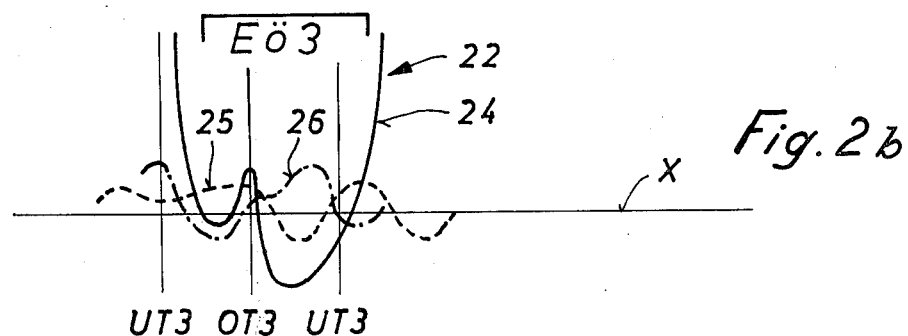
Figure 2C:
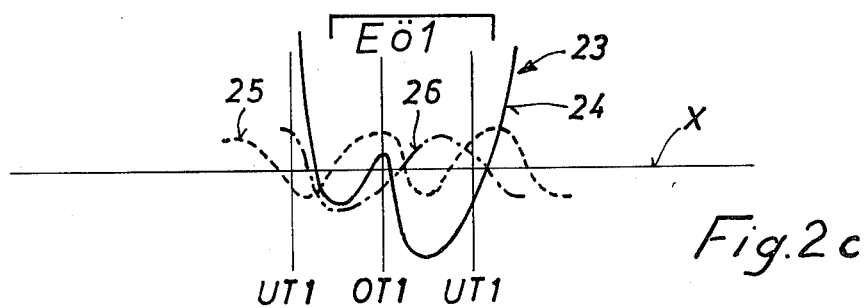

FIGS. 2b and 2c respectively show by way of graphs the pressure characteristics in the cylinders 3 and 1 with the arrangement according to the invention.

Figure 3:
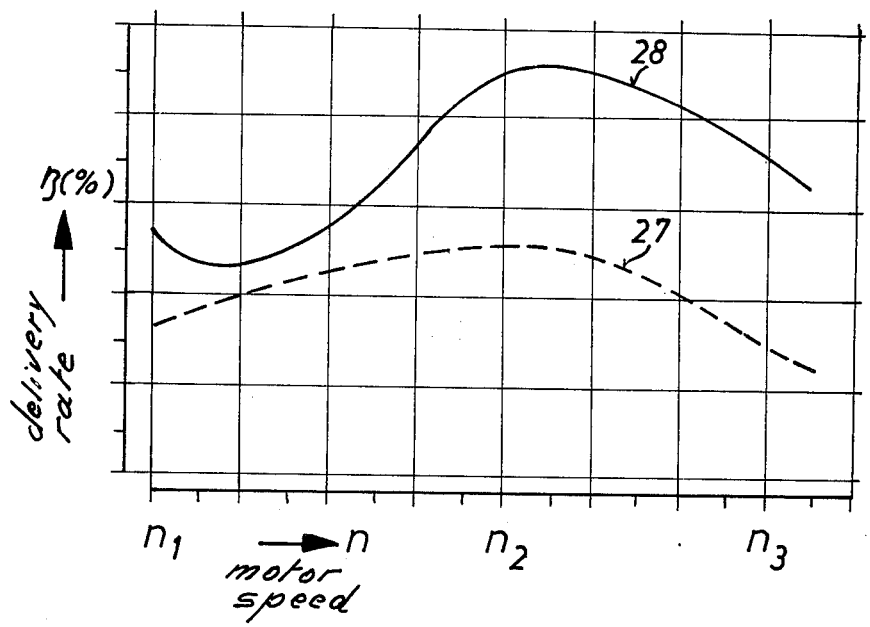

FIG. 3 graphically illustrates a comparison of volumetric efficiencies without and with the arrangement according to the invention.

Figure 4:
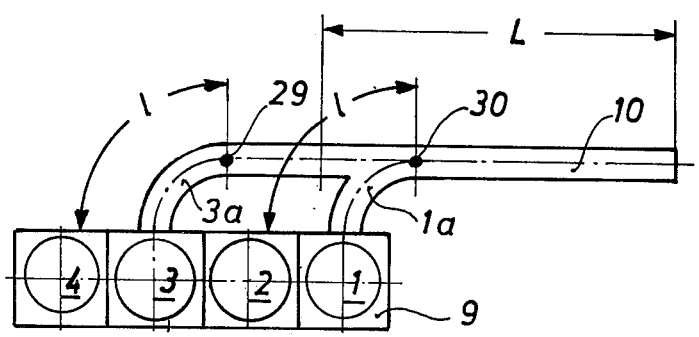

FIG. 4 is a detail from FIG. 1 to explain the mean length of the induction main pipes.

The present invention is characterized primarily by having groups of two inlet ports on a cylinder bank brought together to a common induction main pipe or manifold, the cylinders of each group having a firing interval that is greater or at the most equal to the opening period of the associated inlet valves.

In an eight cylinder engine where the cylinders 1 to 4 form one bank and the cylinders 5 to 8 form the second bank and which is based on a firing order of 1-5-7-2-6-3-4-8 with a firing interval of 90° crank angle this means in terms of the invention that groups are formed of the inlet ports on cylinders 1 and 3, cylinders 2 and 4, cylinders 5 and 6 and cylinders 7 and 8 with an alternate firing interval of 270° and 450° crank angle, each group being combined into a common induction main pipe.

With this configuration, the above outlined objects have been realized surprisingly well, as later tests have verified, and a substantial improvement in volumetric efficiency and output has been achieved. Whereas experts in the art have heretofore entertained the opinon that it was necessarily unfavorable, and that an improvement in the performance data was impossible to be obtained if two inlet ports whose cylinders were timed to fire alternately at greatly different and also wide intervals were combined into a common induction main pipe because of the occurrence of disturbance waves that cannot be controlled and because the air flow in the induction main pipe is interrupted again and again, the present invention now shows that this opinion does not hold true in absoluetly every case.

As a further development of the invention, it is proposed that all induction main pipes be made with an approximately equal mean pipe length adapted to suit the speeds of the engine and taken into a plenum tank in a manner known per se. In order to minimize space requirements, the induction main pipes should be made to project different lengths into the plenum tank.

To reduce the residual gas pressure and, consequently, the pumping work in order to obtain another improvement in volumetric efficiency and to enhance the effect achieved by means of the new inlet system, it is also proposed to group together the exhaust ports of the same cylinders which have their inlet ports in communication with a common induction main pipe and to bring them together into a common exhaust main pipes with diameters and lengths matched in order to similarly avoid overlapping of exhaust times.

Referring now to the drawings in detail, the cylinders of FIG. 1 are designated with the numbers 1 to 8 in groups of four cylinders each (1 to 4 and 5 to 8) being combined into a cylinder bank 9. The engine illustrated is intended to operate with a firing order of 1-5-7-2-6-3-4-8 with a firing interval of 90° crank angle. Each cylinder 1 to 8 has an inlet port 1a to 8a and an exhaust port 1b to 8b. Each group of two inlet ports 1a and 3a, 2a and 4a, 5a and 6a, 7a and 8a communicate with a common induction main pipe 10, 11, 12 and 13. The induction main pipes 10, 11, 12 and 13 each have equal mean lengths and terminate with their outer end in an equalizing tank 14 which may be arranged at either engine side. To accommodate the lengths of the inlet manifolds or main pipes, they project into said tank with the legs of different lengths so that, in the V between the cylinder banks 9, they take up only the absolutely necessary amount of space.

The exhaust system is laid out in a similar manner with each group of two exhaust ports 1b and 3b, 2b and 4b, 5b and 6b as well as 7b and 8b being combined into exhaust main pipes 15, 16, 17 and 18 which eventually terminate in the exhaust line 19. With this arrangement, overlapping or mutual interference can occur neither in the inlet system nor in the exhaust system because the firing interval of all groups of paired cylinders is alternately 270° and 450° crank angle.

In FIGS. 2 and 2a the pressures in the cylinders 3 and 1 are plotted over about 360° crank angle. The units 20 and 21 show the relationships for the cylinders 3 and 1 as existing in the heretofore known conventional arrangement where all inlet ports communicate with a common inlet manifold and all exhaust ports communicate with a common exhaust manifold. The two lower units 22 and 23, however, indicate the values obtainable with the arrangement according to the invention, according to which the inlet ports 3a and 1a are combined into an inlet manifold and the exhaust ports 3b and 1b are combined into an outlet manifold. UT stands for the lower dead center point of the piston and OT for the upper dead center point, and the numbers added are those of the respective cylinders. Thus, the degrees crank angle are plotted on the abscissa and the pressures are plotted on the ordinate starting from the zero line $x$ which indicates the atmospheric pressure. The brackets designated with the reference number designations $Eö3$ or $Eö1$ indicate the opening periods of the inlet valves. It should be noted that these inlet valves open approximately 12° crank angle before OT and close approximately 50° crank angle after UT. Consequently there is a total opening period of approximately 240° crank angle because, between OT and UT, there is a crank angle of 180°. Finally, the heavy line curves 24 indicate the associated pressure in the cylinders 3 and 1, the dash-line curves 25 indicate the pressure in the inlet ports 3a and 1a, and the dot-dash line curves 26 indicate the pressure in the exhaust ports 3b and 1b.

A comparison of units 20 and 21 with units 22 and 23 above all shows clearly that in the engine according to the invention the pressures in the inlet ports 3a and 1a (25) undergo marked pulsations and that there is a positive pressure drop for a cylinder filling at the time of inlet opening and inlet closing (units 22 and 23). It will also be clearly seen that, at the end of the inlet opening in the cylinders 3 and 1, there is already a considerably higher pressure (curves 24) prevailing compared to the conventional concept shown by units 20 and 21 and that, in the case of cylinder 3, there is a marked reduction in residual gas pressure.

The graph reproduced in FIG. 3 has the engine speed n plotted over the abscissa, and the associated delivery rate, supply efficiency or volumetric efficiency $\eta$ in percent plotted over the ordinate. The letter $n_1$ indicates the lower full load speed, $n_2$ indicates the speed at maximum torque, and $n_3$ indicates the rated speed. Because of the different engines, the speed has not been stated in terms of rpm. If, as in the conventional concept, all inlet ports of an eight cylinder V-engine are brought together to one induction manifold and all exhaust ports to one exhaust manifold, there will be a certain characteristic of volumetric efficiencies. The dash-line curve 27 shows this volumetric efficiency. If inlet and exhaust ports are arranged according to the invention, the volumetric efficiency shows a considerable improvement as evinced by the heavy line curve 28. It should be noted that the improvement in volumetric efficiency is particularly noticeable in the important ranges $n_1$, $n_2$, and $n_3$. Corresponding to the improvement in volumetric efficiency, there is an increase in output which, for reason of simplicity, has been omitted in the graph.

FIG. 4 is only intended to explain what is understood by "mean length" of the induction main pipes. Cylinders 1 and 3 with their inlet ports 1a and 3a may serve as an example which both are combined into the induction main pipe 10. In order to obtain almost identical conditions for both cylinders 1 and 3, the real lengths 1 of the inlet ports 1a and 3a are first determined at the points 29 and 30 where they join the induction main pipe 10. Then the distance between the points 29 and 30 is halved and the half way point is where the determination of the mean length L for the induction main pipe 10 is started.

It is, of course, to be understood that the present invention is, by no means limited to the specific showing in the drawings but also comprises any modifications within the scope of the appended claims.

What we claim:

1. A naturally aspirated eight cylinder internal combustion V-engine equalized for mass and bearing loads by more uniformity in firing intervals of the individual cylinders, in which the cylinders of each bank of cylinders are divided into groups of two cylinders each, the first, second, third and fourth cylinders form one cylinder bank and the fifth, sixth, seventh and eighth cylinders form the second cylinder bank, and in which a firing order of he first, fifth, seventh, second, sixth, third, fourth, and eighth cylinder at a firing interval of 90° crank angle is adopted, and which includes in combination: inlet valve means respectively associated with said cylinders, inlet manifolds, the inlet valve means of one group of cylinders pertaining to the same cylinder bank together communicating with a joint inlet manifold, each two cylinders of one group of cylinders having a firing interval which is at least equal to the opening period of the respective inlet valve means pertaining to the respective group of cylinders, the respective inlet valve means with an alternate firing interval of 270° and 450° crank shaft angle being the inlet valve means which are brought together to the respective joint inlet manifolds, and equalizing container means, said manifolds having approximately the same length designed in conformity with the speed of rotation of said engine and leading into said equalizer container means, said inlet manifolds projecting to a different extent into said equalizing container means in order to obtain nearly equal mean lengths of said inlet manifolds.

2. A V-engine in combination according to claim 1, in which said inlet manifolds are so dimensioned that postcharging waves are generated by reflection to enter the respective cylinders at a time when inlet valves therewith are just about to change from their closing to their opening position and vice versa.

3. A V-engine in combination according to claim 1, which includes: exhaust manifolds, exhaust valve means, respectively associated with said groups of cylinders, the exhaust valve means of the same group of cylinders of the same cylinder bank communicating with a common one of said exhaust manifolds, and common exhaust lines respectively communicating with the exhaust manifolds respectively pertaining to said cylinder banks.

4. A V-engine in combination according to claim 3, in which the exhaust valve means pertaining to the first and third cylinders are adapted to communicate with a first one of said common exhaust manifolds, the exhaust valve means pertaining to the second and fourth cylinders are adapted to communicate with a second one of said common exhaust manifolds, the exhaust valve means pertaining to said fifth and sixth cylinders are adapted to communicate with a third one of said common exhaust manifolds, and the exhaust valve means pertaining to the seventh and eighth cylinders are adapted to communicate with a fourth one of said common exhaust manifolds.

* * * * *